G. Meader,
Wrench.

Nº 45,931. Patented Jan. 17, 1865.

Witnesses
J W Coombs
Geo W Reed

Inventor
George Meader
per Munn & Co
Attorneys

UNITED STATES PATENT OFFICE.

GEORGE MEADER, OF OTTAWA, ILLINOIS.

IMPROVEMENT IN WRENCHES.

Specification forming part of Letters Patent No. 45,931, dated January 17, 1865.

*To all whom it may concern:*

Be it known that I, GEORGE MEADER, of Ottawa, in the county of La Salle and State of Illinois, have invented a new and Improved Wrench; and I do hereby declare that the following is a full, clear, and exact description of the same, reference being had to the accompanying drawings, making a part of this specification, in which—

Figure 1:
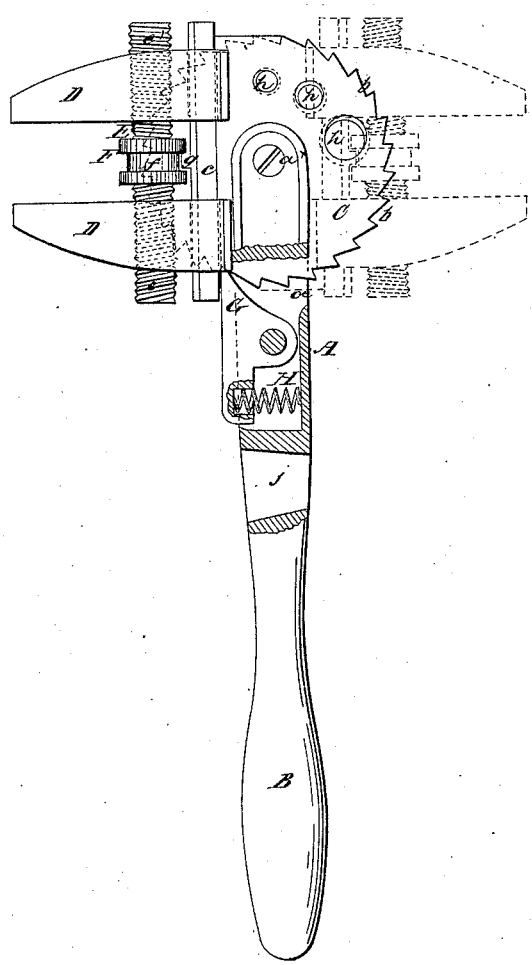
Figure 2:
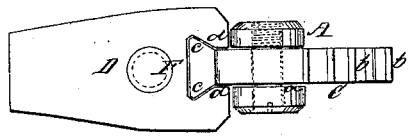

Figure 1 is a side view of my invention, partly in section; Fig. 2, an end view of the same.

Similar letters of reference indicate corresponding parts in the two figures.

This invention consists in having two sliding jaws fitted to the straight edge of a semicircular ratchet-plate and arranged with a right-and left-hand screw in such a manner that by turning said screw the jaws may be adjusted at a greater or less distance apart to suit nuts of different sizes, the ratchet-plate being fitted on an axis in a suitable handle which is provided with a pawl, and all so arranged that the wrench may be used like an ordinary monkey or screw wrench, and, when necessary, used as rotary or ratchet wrench, as hereinafter set forth.

To enable those skilled in the art to fully understand and construct my invention, I will proceed to describe it.

A represents the shank or tang of the wrench, which is constructed of metal and provided with a handle, B, which may be of wood or of metal. If of the latter material, the handle and shank may be constructed all of one piece. The end of the shank A has a slot or recess, *a*, made longitudinally in it to receive a semicircular plate, C, which works on pin *a*\*, and has ratchet teeth *b* on its curved edge, and its straight edge has a dovetail projection, *c*, at each side, which fit in dovetail recesses *d* in the inner ends of jaws D D, said jaws being allowed to slide freely on the straight edge of the plate C. These jaws D D are adjusted simultaneously nearer together or farther apart by means of a rod, E, which has a right and a left hand screw, *c c'*, cut upon it, said screws working in female threads in the jaws. At the center of the rod E there is a thumb-wheel, F, milled at its periphery, and having a groove, *f*, made circumferentially in it to receive a projection, *g*, on the straight edge of the ratchet-plate C. The rod E is turned through the medium of the thumb wheel F, the projection *g*, in consequence of fitting in the groove *f*, preventing the rod E from moving longitudinally.

G is a pawl, which is fitted in the shank A and has a spiral or other spring, H, bearing against it to keep it engaged with the teeth *b* of the plate C, as shown clearly in Fig. 1.

The device is used as follows: The plate C is turned or adjusted in the shank A, so that the two jaws D D will be at right angles with the shank A, and the jaws are then adjusted to the nut to be turned by turning the rod E. The shank A is then moved or vibrated so as to turn the plate C and jaws D D, the pawl G slipping over the teeth *b* of plate C when moved in the direction indicated by the arrow 1, and catching into the teeth and moving the plate and jaws when moved in the direction of arrow 2. By this means the plate C and nut may be turned half a revolution. The jaws are then removed from the nut and the lower end of the pawl G pressed inward to release the plate C, and admit of it being turned back, so that the operation may be repeated until the nut is operated upon as long as desired. The implement may also be used as an ordinary working or screw wrench by taking the jaws from the nut after each movement of the wrench and applying them thereto previous to each movement, and the implement possesses the advantage of allowing the jaws D D, by the adjustment of the plate C, to be set at any convenient angle with the shank A.

The plate C has a series of holes, *h*, made in it, of different sizes and provided each with internal screws for the purpose of forming a screw-plate for cutting screws, and the shank A, near the junction of the handle B, has a taper rectangular opening, *j*, made in it to receive the head of taps for cutting screws, the whole forming a very convenient implement.

Having thus described my invention, what I claim as new, and desire to secure by Letters Patent, is—

As a new article of manufacture, the adjustable wrench, constructed and operating as herein described.

GEO. MEADER.

Witnesses:
M. P. FINN,
LAWRENCE WHITE.